(12) United States Patent
Schreurs et al.

(10) Patent No.: US 8,381,513 B2
(45) Date of Patent: Feb. 26, 2013

(54) INTERNAL COMBUSTION ENGINE SYSTEM

(75) Inventors: Bart Hubert Schreurs, Waltzing (BE); Derk Geurts, Calmus (LU)

(73) Assignee: Delphi Technologies Holding S.arl, Troy, MI (US)

( * ) Notice: Subject to any disclaimer, the term of this patent is extended or adjusted under 35 U.S.C. 154(b) by 582 days.

(21) Appl. No.: 12/599,543

(22) PCT Filed: Jul. 24, 2008

(86) PCT No.: PCT/IB2008/001935
§ 371 (c)(1),
(2), (4) Date: Nov. 10, 2009

(87) PCT Pub. No.: WO2008/149234
PCT Pub. Date: Dec. 11, 2008

(65) Prior Publication Data
US 2010/0223909 A1   Sep. 9, 2010

(30) Foreign Application Priority Data
Oct. 17, 2007   (EP) .................................... 07254103

(51) Int. Cl.
*F01N 3/00* (2006.01)
*F01N 3/10* (2006.01)
*F01N 3/02* (2006.01)
*F02M 25/06* (2006.01)

(52) U.S. Cl. ................. 60/285; 60/276; 60/278; 60/301; 60/303; 60/311

(58) Field of Classification Search .................... 60/276, 60/278, 285, 286, 297, 299, 301, 303, 311
See application file for complete search history.

(56) References Cited

U.S. PATENT DOCUMENTS

| | | | |
|---|---|---|---|
| 2003/0131593 A1* | 7/2003 | Asanuma | 60/297 |
| 2003/0182932 A1* | 10/2003 | Miura et al. | 60/284 |
| 2005/0022512 A1* | 2/2005 | Shirakawa | 60/285 |
| 2005/0072141 A1* | 4/2005 | Kitahara | 60/297 |
| 2006/0048744 A1* | 3/2006 | Castagne et al. | 123/305 |
| 2007/0169464 A1* | 7/2007 | Saito et al. | 60/276 |
| 2008/0041038 A1* | 2/2008 | Freitag et al. | 60/287 |
| 2008/0053217 A1* | 3/2008 | Nishio et al. | 73/291 |

FOREIGN PATENT DOCUMENTS

| | | |
|---|---|---|
| EP | 1057983 | 12/2000 |
| EP | 1350932 | 10/2003 |
| JP | 9-14026 | 1/1997 |
| JP | 11-294226 | 10/1999 |
| JP | 2002-81313 | 3/2002 |
| JP | 2004-340137 | 12/2004 |
| JP | 2005-264808 | 9/2005 |

(Continued)

OTHER PUBLICATIONS

Toshimasa Koga, Machine Translation of JP 2007-177641 A, Jul. 12, 2007.*
European Search Report dated Jul. 29, 2010.

*Primary Examiner* — Kenneth Bomberg
*Assistant Examiner* — Audrey K Bradley
(74) *Attorney, Agent, or Firm* — Mark H. Svoboda (57) ABSTRACT

A compression-ignition internal combustion engine system having an exhaust passage and an exhaust gas treatment arrangement, wherein the exhaust gas treatment arrangement comprises a three-way catalytic converter.

6 Claims, 5 Drawing Sheets

FOREIGN PATENT DOCUMENTS

| | | |
|---|---|---|
| JP | 2006-177202 | 7/2006 |
| JP | 2006-274985 | 10/2006 |
| JP | 2007-177641 | 7/2007 |
| JP | 2007177641 A * | 7/2007 |
| WO | 02/14665 | 2/2002 |
| WO | 2007/068328 | 6/2007 |

* cited by examiner

INTERNAL COMBUSTION ENGINE SYSTEM

TECHNICAL FIELD

The invention relates to internal combustion engines. More specifically, the invention relates to a compression-ignition (diesel) internal combustion engine that is configured to reduce the emission of harmful exhaust gases.

BACKGROUND OF THE INVENTION

The use of the internal combustion engine is abundant. Since internal combustion engines burn fossil fuels within the cylinders of the engines, gases are emitted that are potentially both harmful to human health and harmful to the environment. Over the past few decades, internal combustion engine usage has risen dramatically with the attendant increase of environmental pollutants.

The main gases of concern emitted from the exhaust system of a vehicle are i) Hydrocarbons (HC) which comprise unburned or partially burned fuel and which, in addition to being toxic, are a significant contributor to smog in urban areas; Nitrogen Oxides (NOx) which are created when nitrogen in the engine air flow reacts with oxygen in the high temperature-pressure conditions inside the combustion cylinders and which are a factor in both smog and acid rain; Carbon Monoxide (CO) which is a product of incomplete combustion and which is also toxic to humans; Carbon Dioxide ($CO_2$) which is a by-product of the combustion process and is considered one of the most significant green house gases; and Particulate Matter (PM), also referred to as soot.

The types of internal combustion engine that are in most widespread use in on-road and off-road applications are the spark ignition engine (gasoline fuelled) and the compression-ignition (diesel) engine.

In a spark ignition engine a throttle valve controls the rate of air supplied to the engine in response to a power demand by the vehicle operator such that a fuel supply system supplies an amount of fuel based on the air supply rate to obtain a desired air/fuel ratio. To reduce the exhaust emissions from such an engine it is known to use a catalytic converter having the functionality of a reduction catalyst to reduce $NO_2$ to nitrogen and oxygen and an oxidation catalyst to oxidize CO to $CO_2$ and HC to water and $CO_2$. For optimum operation of the catalytic converter, the spark ignition engine is operated under stoichiometric operating conditions in which the amount of oxygen supplied to the cylinders of the engine is the exact amount required to completely combust the amount of fuel supplied. In the case of gasoline the stoichiometric air/fuel ratio around is 14.7:1, although the exact value depends on the fuel composition.

In contrast to spark ignition engines, diesel engines are operated under diesel combustion conditions in which the air/fuel ratio is much leaner than that of the spark ignition engine, typically between 20:1 and 40:1.

In a diesel engine, air is introduced into the cylinder head via an inlet valve and is compressed during an compression stroke of the piston which compresses and heats the induced air. Fuel is injected directly into the cylinder at close to top dead centre piston position and is ignited by the heated air which causes combustion and a corresponding rapid expansion of the compressed air/fuel mixture that drives the piston on a power stroke. The air inducted into the cylinder is not throttled as it is in a gasoline engine and as a result a diesel engine naturally runs at a much higher air/fuel ratio.

The diesel engine has many benefits. For example, as a result of its leaner combustion regime and higher compression ratio, the diesel engine has increased thermal efficiency over gasoline engine which translates into a greater torque at comparatively low engine speeds and a greater fuel economy.

One of the characteristic emissions of the diesel engine is the generation of particulate matter or soot, in addition to the emission of hydrocarbons, carbon dioxide and the like. To combat the emissions of diesel engines, it is known to employ various devices to clean the exhaust gases. For example, it is known to place a diesel particulate filter (DPF) in the exhaust system to reduce approximately 80% to 100% of particulate matter entrained in the exhaust gas flow.

It is also known to use a diesel oxidation catalyst (DOC) which uses excess oxygen in the exhaust gas flow to oxidize CO to $CO_2$ and HC to water and $CO_2$. However, such a device is unable to reduce the NOx present in the gas flow significantly.

A major challenge facing the future of the diesel engine is the reduction of NOx output in a cost-efficient manner.

In general, two main approaches are used in an effort to reduce NOx emissions. Firstly diesel engines are run with extremely high exhaust gas recirculation (EGR) rates in an effort to lower the combustion temperature of the cylinders thus reducing NOx generation. Although a high EGR rate is effective at engine idle and relatively low engine load conditions, it is difficult to obtain high EGR rates at medium to high load conditions, for example during acceleration phases of a vehicle since a relatively high amount of fresh air is required for combustion. Secondly, it is known to use devices generally referred to as NOx absorbing devices ("NOx traps" or "NOx absorbers") and selective catalytic reduction ("SCR") devices, both technologies being known to the person skilled in the field of diesel engine technology.

However, SCR devices tend to be expensive and need a minimum temperature to operate efficiently which requires regimes to heat up the device: typically this is via late injection of fuel which leads to oxidzation of fuel in the SCR device in order to raise its temperature. SCR devices are generally undesirable due to the complexity of the apparatus itself, the associated control system, and the fact that it impacts adversely on the engine fuel consumption. As for NOx absorbing devices, they require periodic regeneration in order to maintain their effectiveness which, again, impacts adversely the engine fuel consumption. Moreover, the presence of sulphur in diesel fuel can degrade the performance of NOx absorbing devices which limits their use to geographic areas in which the fuel supply is of acceptable quality.

As can be appreciated, the provision of several of such devices in an effort to combat the varied emission from the diesel engines results in an excessively costly system that, in general, lacks widespread viability for commercial vehicles and smaller vehicles for the private motorist.

It is an object of the invention to provide a diesel engine system that avoids or at least mitigates some of the problems explained above.

SUMMARY OF THE INVENTION

It is against this background that the invention provides a compression-ignition engine system having a compression-ignition engine, an exhaust passage and an exhaust gas treatment arrangement, wherein the exhaust gas treatment arrangement comprises a three-way catalytic converter.

Preferably, the diesel engine is operated in a substantially stoichiometric combustion mode.

The primary advantage of the invention over alternative emission management systems for compression-ignition engines is its simplicity. For example, the three-way catalytic converter is technically less complex than an SCR system which requires urea storage, supply and cooling sub-systems. This reduction in complexity results in a reduced weight and cost of the engine system as a whole. This confers a further benefit in terms of engine fuel economy.

In order for the three-way catalytic converter to operate at or near to its optimum efficiency, it is preferred to operate the compression-ignition internal combustion engine within a small window around the stoichiometric air/fuel ratio. Since this is not a natural way of operating a diesel engine, without incurring significant drawbacks in terms of fuel consumption and particulate emissions, a specific control regime is preferred.

Therefore, in an embodiment of the invention the engine is operated so as to control the flow rate of gases into one or more combustion chamber of the engine and/or controlling the injection of fuel into said one or more combustion chambers to provide stoichiometric combustion over a predetermined range of engine load. For example, in a first mode, at low engine loads, the engine is operated at high EGR rates under normal diesel combustion to reduce NOx emissions, in a second mode, at medium to high engine loads, the engine is operated under stoichiometric conditions where NOx emissions can be reduced by way of the three-way catalytic converter and, in a third mode, under very high engine loads and/or engine speeds, the engine is operated under normal diesel combustion conditions and low EGR rates to obtain maximum torque.

Furthermore, in order to control the engine to operate in a narrow range of air/fuel ratio in certain engine conditions, the engine may be operated in an air-lead mode whereby the intake air flow rate is controlled to achieve a demanded torque and an amount of fuel injected is controlled to obtain a target air/fuel ratio based upon the intake air flow rate.

In a further embodiment the exhaust sub-system comprises a diesel particulate filter located downstream of the three-way catalytic converter in a direction of exhaust gas flow. The placement of the particulate filter ensures that in addition to the removal of hydrocarbons, nitrogen oxides and carbon monoxides from the exhaust flow, the system also removes particulate matter from the exhaust gas flow to a high degree of efficiency. Furthermore, being placed downstream of the three-way catalytic converter ensures that the particulate filter is located in a beneficial environment in terms of exhaust temperature. A further benefit is that during lean operating conditions, the three-way catalytic converter functions in a similar manner to a diesel oxidation catalyst and as such can create heat via an exothermic reaction which helps increase exhaust gas temperature for regeneration of the particulate filter.

A first oxygen sensor (also known as a lambda sensor or lambda probe) may be disposed in the exhaust passage downstream of the engine but upstream of the three-way catalytic converter in order to monitor the constituent exhaust gases and so enable the accurate control of the air/fuel ratio supplied to the cylinders of the engine such that optimum performance of the three-way catalytic converter can be maintained.

In a further embodiment, the system may also include an oxygen sensor disposed downstream of the three-way catalytic converter but upstream of the diesel particular filter. Positioning a further oxygen sensor in the exhaust system in this way permits precise trimming of the engine air/fuel ratio since downstream of the catalytic converter, the real air/fuel ratio can be measured more precisely as all of the fuel has reacted with the free oxygen. Furthermore, this secondary oxygen sensor permits the use of diagnostic functions which are based on the oxygen storage capacity of the three-way catalytic converter. The oxygen storage capacity of the catalytic converter is indicative of how efficiently it is operating. As the oxygen storage capacity decreases over time, the conversion efficiency of the catalytic converter will also decrease. The oxygen storage capacity of the catalytic converter is measured by introducing a fluctuating air/fuel ratio about stoichiometry at the inlet side of the converter which is detected by the first oxygen sensor. When the converter is operating correctly, it absorbs the excess oxygen received during lean conditions and releases oxygen during rich conditions. Thus, the second oxygen sensor will see a substantially constant air/fuel ratio. However, the second oxygen sensor will begin to detect fluctuations in the air fuel ratio when the oxygen storage functionality of the converter degrades. The engine control unit monitors the first and second oxygen sensors and may derive a health index of the catalytic converter based on the ratio of the signals from the first and second oxygen sensors.

The oxygen sensor may be a binary oxygen sensor or a wide-range oxygen sensor depending on the trimming requirements. A wide range sensor enables the oxygen content in the exhaust gas flow to be determined over a wider range, but at greater cost, than a binary oxygen sensor which outputs a signal that is indicative of the air/fuel ratio being i) substantially equal to stoichiometry, ii) rich or iii) lean.

In another embodiment, the exhaust sub-system further includes a fuel injector disposed upstream of the three-way catalytic converter, thus intermediate the catalytic converter and the engine. This is advantageous since it permits the engine to be operated at leaner air/fuel ratios than stoichiometic whilst providing a means to enrich the content of fuel within the exhaust gas so as to improve the operation of the three-way catalytic converter. In effect, the converter 'sees' a richer mixture than the current combustion mode of the engine. Moreover, the provision of the further fuel injector avoids the increase in particulate emissions that are generally associated with operating a diesel engine under too rich a combustion mode.

BRIEF DESCRIPTION OF THE DRAWINGS

In order that it may more readily be understood, the invention will now be described, by way of example only, with reference to the following drawings in which.

DETAILED DESCRIPTION OF THE EMBODIMENTS

Figure 1:
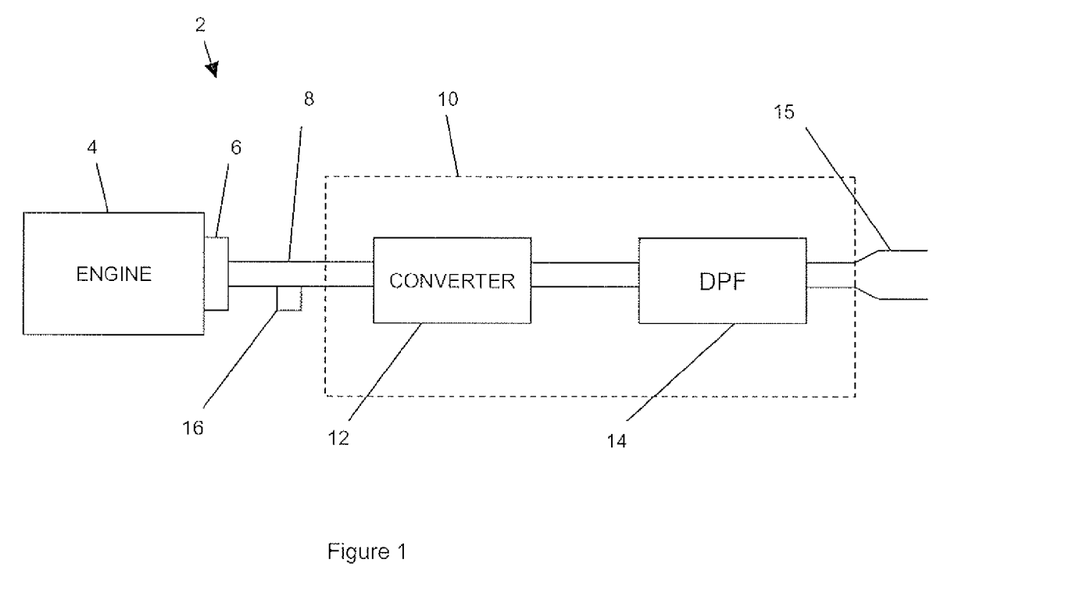
FIG. 1 is a schematic diagram of a compression-ignition internal combustion engine system in accordance with an embodiment of the invention.

In FIG. 1 there is shown a compression-ignition internal combustion engine 2 in accordance with the invention that includes an engine unit 4 to which is attached an exhaust manifold 6 that collects the exhaust gas flow from the individual cylinders of the engine (not shown) and directs the gas flow into an exhaust passage or pipe 8. The exhaust passage 8 leads from the engine 4 to an exhaust gas treatment arrangement 10.

The exhaust gas treatment arrangement comprises a 3-way catalytic converter 12 and a diesel particulate filter (DPF) 14. The 3-way catalytic converter 12 serves to carry out the following treatment of the exhaust gases output from the engine: firstly, it operates to reduce nitrogen oxides (NOX) to nitrogen and oxygen; secondly, it operates to oxidize carbon monoxide to carbon dioxide; and, thirdly, it operates to oxidize hydrocarbons to carbon dioxide and water.

The diesel particulate filter 14 serves to reduce the level of particulate matter and soot that is entrained in the exhaust gas flow and which is not reduced by the 3-way catalytic converter 14. Such a particulate filter is known in the art and may take the form of, for example, a cordierite wall flow filter or a silicon carbide wall flow filter. Downstream of the particulate filter 14 is an exhaust outlet nozzle 15 from which the treated exhaust gas flow exits the engine system 2 to the outside environment.

Attached to the exhaust passage 8 between the engine and the 3-way catalytic converter 12 is an oxygen sensor 16. The oxygen sensor 16, also known in the art as a lambda probe/sensor is a linear sensor and is inserted into the exhaust passage 8 so as to measure the concentration of oxygen remaining in the exhaust gas flow. The oxygen sensor 16 may be a narrow band (also known as a binary sensor) or, preferably, a wide band sensor to provide an accurate measure of the oxygen content of the exhaust gas. The oxygen sensor 16 provides a signal to an engine control system (not shown) which enables the engine 4 to be controlled to ensure efficient combustion processes and, thus, efficient operation of the 3-way catalytic converter 12.

The 3-way catalytic converter 12 operates most efficiently when it receives exhaust gas flow from the engine 4 during circumstances where the engine 4 is running around the stoichiometric operating point, which corresponds to an air/fuel ratio between approximately 20 to 40 parts air to 1 part fuel for diesel engines. The exact value is dependent on the type of fuel in use.

When there is more oxygen than is required in the air/fuel ratio, the engine system is said to be running lean, in which the system is in an oxidizing condition. In such circumstances the two oxidizing reactions of the 3-way catalytic converter (converting carbon monoxide to carbon dioxide and converting hydrocarbons to carbon dioxide and water) are more efficient than the reducing reaction (converting nitrogen oxides to nitrogen and oxygen).

Conversely, when there is excessive fuel in the air/fuel ratio, the engine system is said to be running rich such that the reduction of nitrogen oxides is favoured at the expense of a lower efficiency of the oxidizing reactions.

Thus, in order for the 3-way catalytic converter to be operated most efficiently for both oxidizing and reducing reactions, it is necessary to operate the compression-ignition engine 4 at a stoichiometric operating point for at least some of its engine operating regions.

Figure 2:
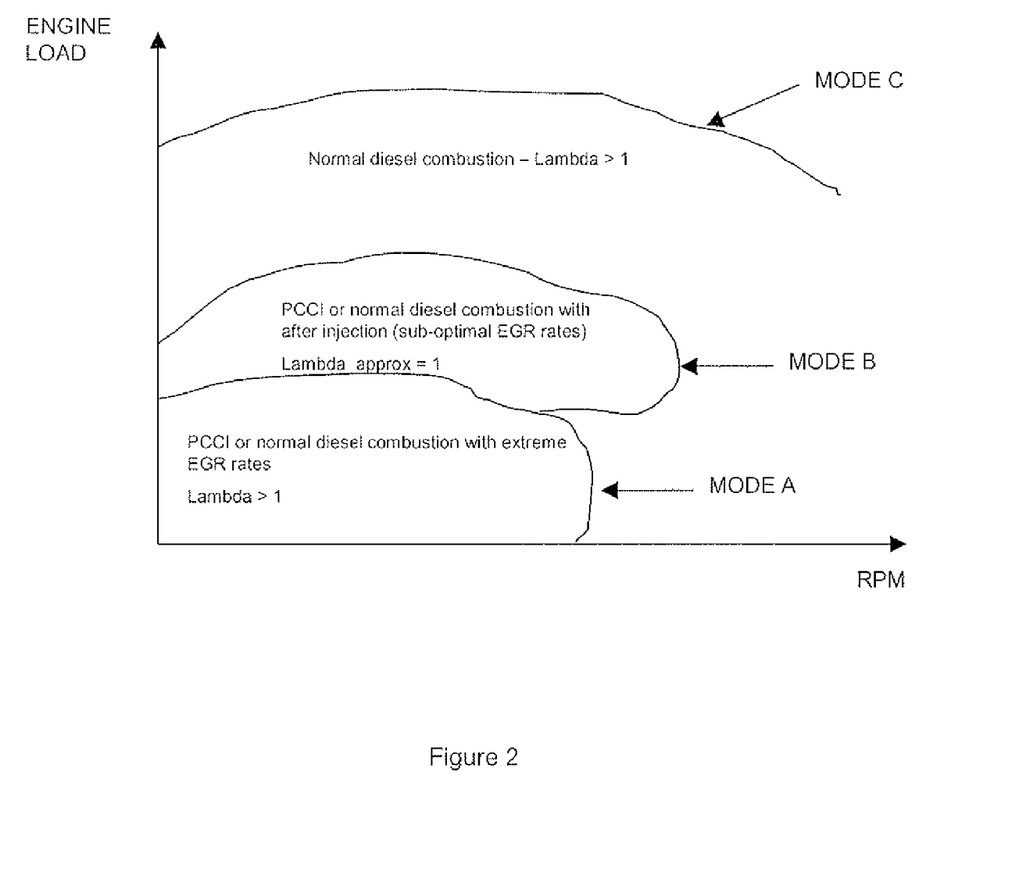
FIG. 2 is a graph of engine load against engine speed according to a method of operating the engine system in FIG. 1.

FIG. 2 exemplifies a method of operating a diesel engine which is particularly beneficial in operation of the engine system illustrated in the FIG. 1. In a first or low load mode (labeled mode 'A') the engine is operated at very high EGR rates (typically greater than 50%) under normal diesel combustion conditions (lean burn; lambda>1) in order to reduce NOx emissions when the engine is under comparatively low load—for example light acceleration or substantially steady state cruising.

In the first engine mode, the operating characteristics of the engine 4 are such that, particularly when in PCCI mode (pre-mixed charge compression-ignition), the engine NOx emissions are very low (approximately in the region of less than 15 part per million (PPM)) such that no or minimal after treatment of the exhaust gases is required. Therefore, it is not necessary to operate the engine 4 at stoichiometry in this low load area.

A second combustion mode (labeled mode 'B') prevails when the engine 4 is experiencing medium to high engine loads, for example during moderate acceleration or high steady state cruising speeds. In the second combustion mode, the engine is operated under stoichiometric conditions. In this second mode, when the engine 4 is working harder than in mode A, high EGR rates are not achievable (since a greater amount of fresh air is required for combustion) so under normal diesel combustion conditions, the NOx output of the engine 4 increases significantly. In this region, therefore, the combustion condition is modified such that the air/fuel ratio becomes stoichiometric. Therefore, in this second region the 3-way catalytic converter 12 operates at maximum efficiency to reduce NOx content of the exhaust gases as well as hydrocarbons and carbon monoxide. Moreover, the higher exhaust temperatures that go hand in hand with a higher engine load facilitate efficient operation of the 3-way catalytic converter 12.

In order to make the diesel engine 4 run at stoichiometry in the second mode with limited smoke emissions, the engine 4 requires operation in a PCCI combustion regime or in normal diesel combustion with high EGR and potentially one or more after injections. However, running with after injections results in slightly worsened fuel economy (in the region of 4 to 5%).

In a third combustion mode (labeled mode 'C'), the engine 4 is operated under very high load and/or engine speeds, for example during maximum acceleration and very high cruising speeds. In this combustion mode the engine 4 is operated under normal diesel combustion conditions and low EGR so as to obtain maximum torque.

Referring once again to mode B described above, the engine 4 is operated under stoichiometric conditions in order to maximize the efficiency of the 3-way catalytic converter 12. One way in which the engine 4 can be operated in order to help maintain a desired value of lambda during quasi/semi steady state conditions, is to operate the engine 4 under a so-called "air lead" condition. In this condition, the rate of EGR is calculated by the engine control system such that there remains just enough fresh air for the engine to produce the torque requested by the driver at the desired air/fuel ratio. However, the EGR control rate valve of the engine has only a finite response speed such that in the event of rapidly fluctuating torque demands, for example, due to slight changes of driver pedal position or changes in road surface conditions, the EGR valve cannot keep pace.

By way of explanation, in the case of a step decrease in torque demand, the fuel that needs to be injected also decreases in a step changer manner. In order for the air/fuel ratio (lambda value) to remain at the same desired value (preferably stoichiometry), the fresh air into the engine must be decreased. This is achieved by the EGR valve operating to circulate a greater amount of exhaust gases from the exhaust side of the engine 4 back into the air intake of the engine 4. However, this cannot happen instantaneously so in the meantime the air/fuel ratio departs significantly from the desired value.

In order to avoid any departure from the target air/fuel ratio (in this case lambda=1), the engine is operated on the basis of an "air-lead" regime which permits the air/fuel ratio to be controlled within tight boundaries during steady state engine conditions.

When the engine is operated in accordance with the air-lead regime, the desired air mass the flows into the engine 4 is computed by the engine control system as it is computed under normal diesel combustion conditions and the desired air mass flow into the engine is controlled by controlling the EGR rate. The fuel that is actually injected into the engine is calculated from the available fresh air and the desired air/fuel ratio.

The torque response of the air-lead regime is limited to the response speed of the change in EGR value so the air lead regime is operated during a limited range of engine conditions. For example, when the engine 4 is operated in mode B in which a stoichiometric air/fuel ratio is required, the quantity of fuel injected will be adjusted to obtain the exact target air/fuel ratio based on the measured fresh air quantity entering the engine; in other words the air 'leads' the fuel. The calculated EGR rate will drive the air/fuel ratio close to the desired air/fuel ratio and, in theory, exactly to the target air/fuel ratio.

The engine control system calculates the air/fuel ratio that would be obtained if the desired fuel (which is based on the torque demanded from the driver) was injected into the available fresh air. If this calculated air/fuel ratio exceeds the target air/fuel ratio by a predetermined, and calibratable, amount the air/lead regime is disabled and the engine is operated in the 'fuel-lead' regime again until the actual air/fuel ratio returns to a predetermined threshold away from the desired air/fuel ratio.

The above control regime enables the actual air/fuel ratio to follow the target air/fuel ratio precisely where the dynamics of the torque changes requested by the driver to not result in air/fuel ratios larger than a predetermined value.

A particular advantage of the system of the invention over known compression-ignition internal combustion engine systems that include exhaust gas treatment strategies such as NOX absorber and/or SCR technology is its simplicity which, in turn, reduces the overall unit cost of the engine system. Furthermore, the placement of the DPF 14 downstream of the 3-way catalytic converter ensures beneficial environmental conditions for the DPF 14 in terms of the temperature of the exhaust gas flow when it reaches the DPF 14 and in terms of exhaust gas compensation to reduce particulate emissions.

Figure 3:
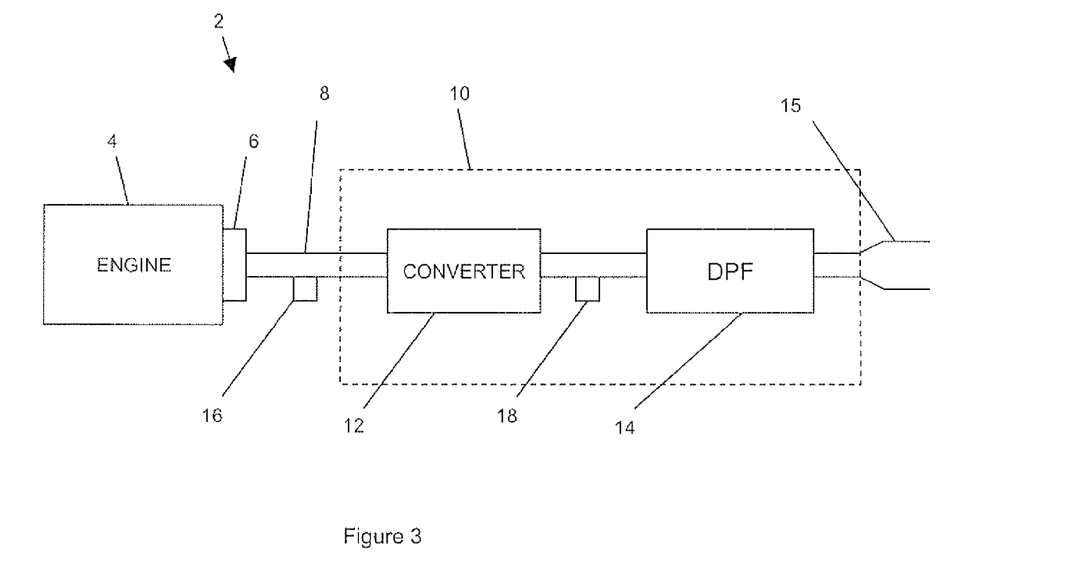
FIG. 3 is a compression-ignition internal combustion engine system in accordance with a second embodiment of the invention.

In the embodiment of FIG. 3, in which like parts are denoted by like reference numerals, the compression-ignition engine system 2 includes a further oxygen sensor 18 disposed downstream of the 3-way catalytic converter 12 but upstream of the DPF 14, that is to say, between them. In this embodiment, the further oxygen sensor 18 is a binary sensor which takes two states in order to indicate the presence of a greater, or lesser amount of oxygen than a predetermined threshold.

The purpose of the further oxygen sensor 18 is to permit a finer degree of control over the air/fuel ratio in order to ensure the most efficient operation of the 3-way catalytic converter 12. In addition, the further oxygen sensor 18 allows the engine control system to monitor the amount of oxygen stored by the 3-way catalytic converter 12 by comparing the response of the first oxygen sensor 16 and the second oxygen sensor 18. Positioning a further oxygen sensor in the exhaust system in this way permits precise trimming of the engine air/fuel ratio since downstream of the catalytic converter, the real air/fuel ratio can be measured more precisely as all of the fuel has reacted with the free oxygen. Furthermore, this secondary oxygen sensor permits the use of diagnostic functions which are based on the oxygen storage capacity of the three-way catalytic converter. The oxygen storage capacity of the catalytic converter is indicative of how efficiently it is operating. As the oxygen storage capacity decreases over time, the conversion efficiency of the catalytic converter will also decrease. The oxygen storage capacity of the catalytic converter is measured by introducing a fluctuating air/fuel ratio about stoichiometry at the inlet side of the converter which is detected by the first oxygen sensor. When the converter is operating correctly, it absorbs the excess oxygen received during lean conditions and releases oxygen during rich conditions. Thus, the second oxygen sensor will see a substantially constant air/fuel ratio. However, the second oxygen sensor will being to detect fluctuations in the air fuel ratio when the oxygen storage functionality of the converter degrades. The engine control unit monitors the first and second oxygen sensors and may determine a health index of the catalytic converter bases on the ratio of the signals from the first and second oxygen sensors.

The second oxygen sensor 18 is a binary sensor which provides a sufficient degree of analysis of the exhaust gas to permit diagnosis of the 3-way catalytic converter 12. However, it should be appreciated that a wide-band sensor could also be used here, albeit at a greater cost. Alternatively, a NOX sensor could be located in this position to measure the proportion of NOX in the exhaust gas flow and therefore provide a direct indication of the NOX-reducing function of the 3-way catalytic converter.

Figure 4:
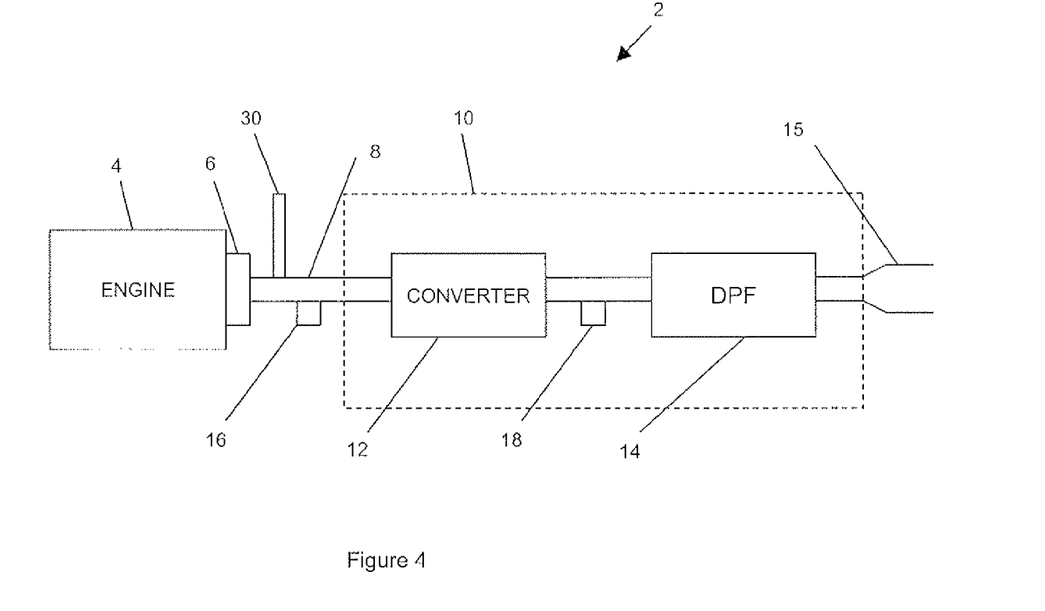
FIG. 4 is a compression-ignition internal combustion engine system in accordance with a third embodiment of the invention.

A further alternative embodiment of the invention is shown in FIG. 4 in which like parts are denoted by like reference numerals. In the embodiment of FIG. 4, the engine system 2 is provided with a fuel injector 30 disposed in the exhaust passage 8 between the engine 4 and the 3-way catalytic converter 12. In this embodiment, the compression-ignition internal combustion engine 4 is able to be operated at leaner operating points (less than stoichiometry) whilst the fuel injector 30 is used to alter the composition of the exhaust gases so as to ensure they are more balanced to optimize the operation of the 3-way catalytic converter 12. This has the effect of decreasing the generation of particulate emissions (because less particulates are generated at a leaner air/fuel ratio) whilst the 3-way catalytic converter 12 operates at high efficiency to reduce emissions of nitrogen oxide, carbon monoxide and hydrocarbons.

Figure 5:
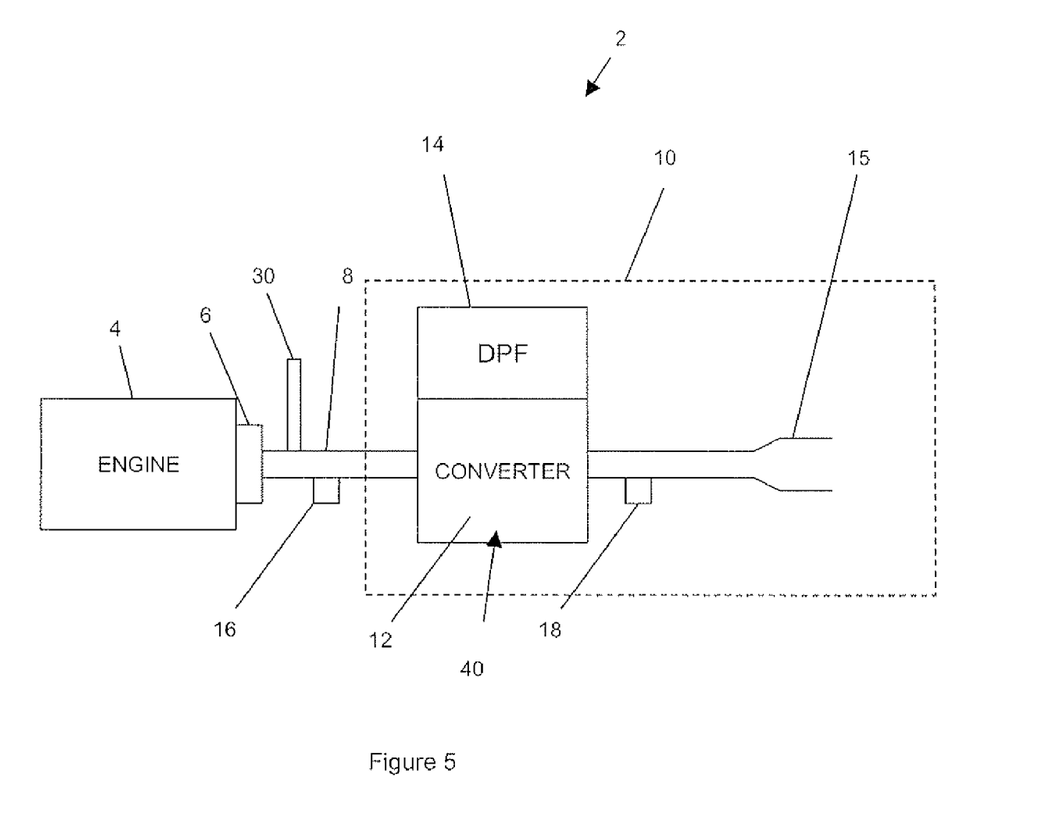
FIG. 5 is a compression-ignition internal combustion engine system in accordance with a fourth embodiment of the invention.

In FIG. 5, in which a further alternative embodiment is shown, the functionality of the 3-way catalytic converter 12 and the DPF 14 are combined into a single unitary diesel engine exhaust treatment package 40. Such a combined catalytic converter and DPF package 40 provides benefits in terms of packaging, thermal management and costs. The issue of thermal management is particularly important since the combined exhaust treatment package 40 enables the temperature of the diesel particulate filter 14 to be maintained at a high level due to its proximity to the engine which is required for regeneration purposes.

It will be appreciated that various alternatives and modifications the embodiments described above will be apparent to the skilled person.

The invention claimed is:

1. A compression-ignition internal combustion engine system comprising:
    a compression-ignition engine,
    an exhaust passage and
    an exhaust gas treatment arrangement, wherein the exhaust gas treatment arrangement comprises a single catalyzing device being a three-way catalytic converter and a diesel particulate filter located downstream of the three-way catalytic converter in a direction of exhaust gas flow;

further comprising an electronic control unit including instructions for:

operating the engine so as to control the flow rate of gases into one or more combustion chambers of the engine and/or to control the injection of fuel into said one or more combustion chambers to provide stoichiometric combustion over a predetermined range of engine load;

in a first mode, at low engine loads, operating the engine at high EGR rates under normal diesel combustion to reduce NOx emissions, in a second mode, at medium to high engine loads, operating the engine under stoichiometric conditions where NOx emissions can be reduced by way of the three-way catalytic converter and, in a third mode, under very high engine loads and/or engine speeds, operating the engine under normal diesel combustion conditions and low EGR rates to obtain maximum torque;

operating the engine in an air-lead mode whereby the intake air flow rate is controlled to achieve a demanded torque and an amount of fuel injected is controlled to obtain a target air/fuel ratio based upon the intake air flow rate;

operating the engine in an air-lead mode during quasi steady state engine conditions and under a fuel-lead mode during conditions of rapid changes in torque demand.

2. The compression-ignition internal combustion engine system according to claim 1, wherein the engine is operated in a substantially stoichiometric combustion mode.

3. The compression-ignition internal combustion engine system according to claim 1, wherein the three-way catalytic converter and the diesel particulate filter are combined into a single unit.

4. The compression-ignition internal combustion engine system according to claim 1, wherein the exhaust gas treatment arrangement includes a first oxygen sensor disposed in the exhaust passage downstream of the engine and upstream of the three-way catalytic converter in order to monitor the constituent exhaust gases and so enable the accurate control of the air/fuel ratio supplied to the engine such that optimum performance of the three-way catalytic converter can be maintained.

5. The compression-ignition internal combustion engine system according to claim 4, wherein the exhaust gas treatment system includes a second oxygen sensor disposed downstream of the three-way catalytic converter and upstream of the diesel particular filter.

6. The compression-ignition internal combustion engine system according to claim 4, further including a fuel injector disposed upstream of the three-way catalytic converter to inject fuel into the exhaust passage.

* * * * *